(12) United States Patent
Leppänen

(10) Patent No.: US 12,668,539 B2
(45) Date of Patent: Jun. 30, 2026

(54) ARRANGEMENT AND METHOD FOR MIXING A PASTE AT A WASTE DISPOSAL SITE

(71) Applicant: Betolar Oy, Kannonkoski (FI)

(72) Inventor: Juha Leppänen, Kannonkoski (FI)

(73) Assignee: Betolar Oy, Kannonkoski (FI)

( * ) Notice: Subject to any disclaimer, the term of this patent is extended or adjusted under 35 U.S.C. 154(b) by 1227 days.

(21) Appl. No.: 17/616,052

(22) PCT Filed: Jun. 3, 2020

(86) PCT No.: PCT/FI2020/050385
§ 371 (c)(1),
(2) Date: Dec. 2, 2021

(87) PCT Pub. No.: WO2020/245506
PCT Pub. Date: Dec. 10, 2020

(65) Prior Publication Data
US 2022/0298071 A1     Sep. 22, 2022

(30) Foreign Application Priority Data

Jun. 3, 2019     (FI) ...................................... 20195469

(51) Int. Cl.
*C04B 18/04*          (2006.01)
*B01F 27/70*          (2022.01)
(Continued)

(52) U.S. Cl.
CPC ...... *C04B 18/0481* (2013.01); *B01F 35/2117* (2022.01); *B01F 35/212* (2022.01);
(Continued)

(58) Field of Classification Search
CPC .............. C04B 18/0481; C04B 28/006; C04B 40/0042; C04B 2111/00784; B01F 35/212;
(Continued)

(56) References Cited

U.S. PATENT DOCUMENTS 4,055,255 A    10/1977  Vasquez
5,004,022 A     4/1991  Carlsson
(Continued)

FOREIGN PATENT DOCUMENTS

AU        68493/74        6/1976
CN        1384078 A      12/2002
(Continued)

OTHER PUBLICATIONS

English translate (CN100500605C), retrieved date Jul. 25, 2025.*
(Continued)

*Primary Examiner* — Mohammed S. Alawadi
(74) *Attorney, Agent, or Firm* — Merchant & Gould P.C.

(57)     ABSTRACT

An arrangement and a method for mixing and handling industrial side-stream materials. The mixer (6) is arranged onto a movable work machine (5) and it is used for mixing at least two side-stream materials to form a geopolymer. The side-stream materials are processed between a waste pile (4) and a casting area (13) in the mixer (6). Cast paste is allowed to harden and after that it is crushed to obtain an earthwork material.

2 Claims, 5 Drawing Sheets

Figure 3:
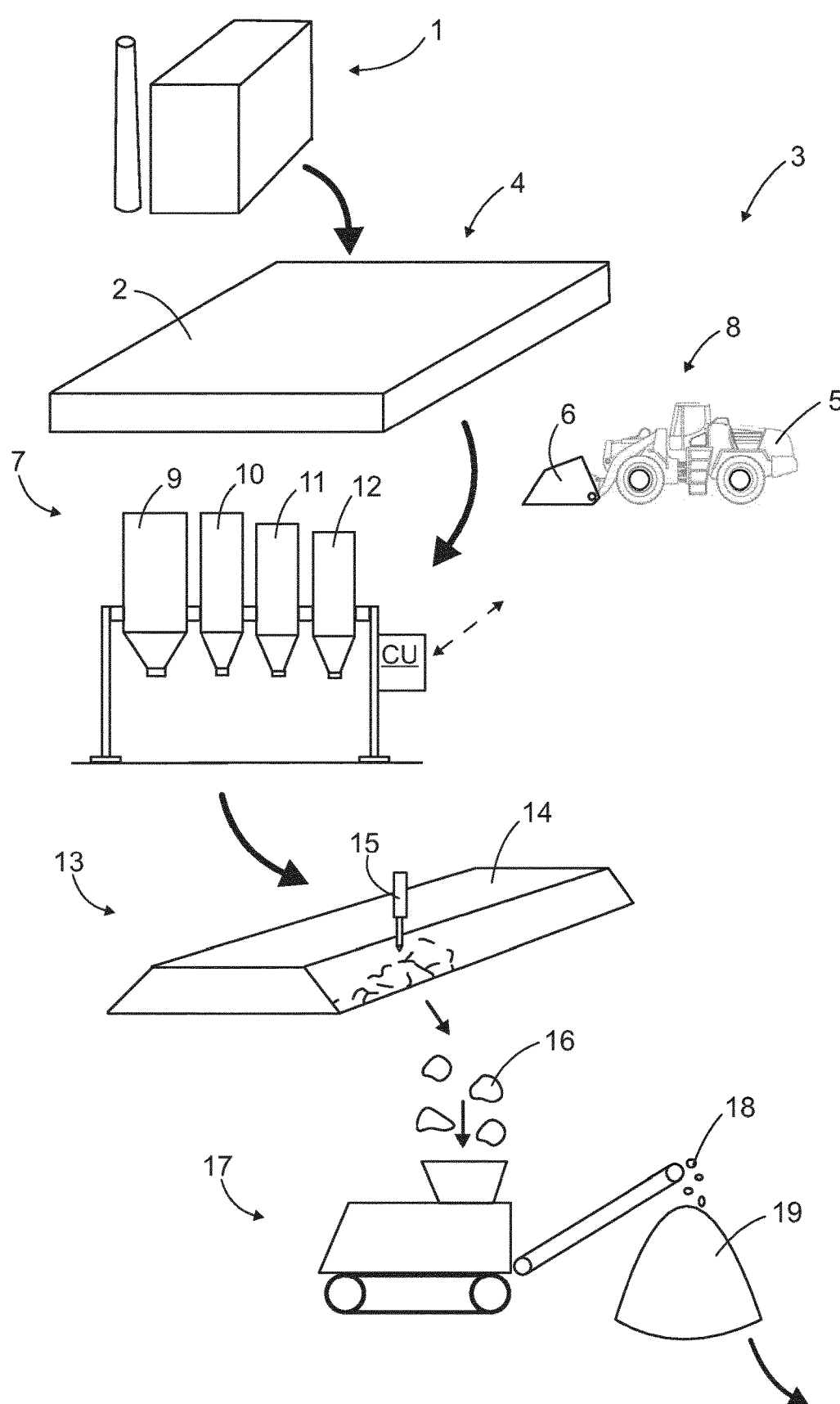

(51) Int. Cl.

| | |
|---|---|
| *B01F 27/702* | (2022.01) |
| *B01F 33/502* | (2022.01) |
| *B01F 35/21* | (2022.01) |
| *B01F 35/212* | (2022.01) |
| *B01F 101/00* | (2022.01) |
| *B01F 101/25* | (2022.01) |
| *B09B 3/25* | (2022.01) |
| *B09B 101/30* | (2022.01) |
| *B09B 101/55* | (2022.01) |
| *C04B 11/00* | (2006.01) |
| *C04B 28/00* | (2006.01) |
| *C04B 40/00* | (2006.01) |
| *E02F 7/06* | (2006.01) |
| *C04B 111/00* | (2006.01) |

(52) U.S. Cl.
CPC ............ *B01F 35/2135* (2022.01); *B09B 3/25* (2022.01); *C04B 28/006* (2013.01); *C04B 40/0042* (2013.01); *E02F 7/06* (2013.01); *B01F 27/702* (2022.01); *B01F 33/5021* (2022.01); *B01F 2101/25* (2022.01); *B01F 2101/2805* (2022.01); *B09B 2101/30* (2022.01); *B09B 2101/55* (2022.01); *C04B 2111/00784* (2013.01)

(58) Field of Classification Search
CPC .............. B01F 35/2117; B01F 35/2135; B01F 2101/25; B01F 2101/2805; B01F 27/702; B01F 33/5021; B01F 33/502; B09B 3/25; B09B 2101/55; B09B 2101/30; E02F 7/06
See application file for complete search history.

(56) References Cited

U.S. PATENT DOCUMENTS

| | | | | |
|---|---|---|---|---|
| 5,385,403 | A | | 1/1995 | Knight et al. |
| 5,905,039 | A | * | 5/1999 | Mutka .................... C05F 17/90 |
| | | | | 435/290.1 |
| 7,510,365 | B2 | * | 3/2009 | Babiarz ................. E02F 3/3414 |
| | | | | 37/903 |
| 8,893,409 | B1 | | 11/2014 | Rossi, Jr. |
| 9,121,164 | B1 | * | 9/2015 | Babiarz ................... E02F 3/348 |
| 2006/0242864 | A1 | | 11/2006 | Jonninen |
| 2007/0243053 | A1 | * | 10/2007 | Babiarz ................. E02F 3/3414 |
| | | | | 414/725 |
| 2009/0071379 | A1 | | 3/2009 | Boxley |
| 2014/0144051 | A1 | | 5/2014 | Sewell |
| 2017/0183844 | A1 | | 6/2017 | Vanderford et al. |
| 2018/0118616 | A1 | | 5/2018 | Camali et al. |
| 2019/0026914 | A1 | | 1/2019 | Hageman et al. |
| 2019/0105801 | A1 | | 4/2019 | Martinez et al. |

FOREIGN PATENT DOCUMENTS

| | | | | | |
|---|---|---|---|---|---|
| CN | 1526676 | A | * | 9/2004 | ............. C04B 28/08 |
| CN | 100500605 | C | * | 6/2009 | ............. C04B 28/08 |
| CN | 105133684 | A | | 12/2015 | |
| CN | 105272344 | A | | 1/2016 | |
| CN | 105887960 | A | | 8/2016 | |
| CN | 109400042 | A | | 3/2019 | |
| DE | 202007001508 | U1 | | 8/2007 | |
| DE | 102016002644 | A1 | | 9/2017 | |
| EA | 29640 | | | 4/2018 | |
| EP | 771775 | A1 | * | 5/1997 | ............. C05F 17/02 |
| EP | 2380655 | A1 | | 10/2011 | |
| FR | 2317068 | A1 | | 2/1977 | |
| FR | 3014641 | A1 | | 6/2015 | |
| JP | H11180744 | A | | 7/1997 | |
| JP | H1192204 | A | | 4/1999 | |
| RU | 81495 | U1 | | 3/2009 | |
| RU | 181169 | U1 | | 7/2018 | |
| WO | 95/06177 | A1 | | 11/1995 | |
| WO | 2013/043394 | A1 | | 3/2013 | |
| WO | 2014/053698 | A1 | | 4/2014 | |
| WO | 2016131015 | A2 | | 8/2016 | |

OTHER PUBLICATIONS

English translate (CCN1526676A), retrieved date Oct. 24, 2025.*
PCT International Search Report for PCT Application No. PCT/FI2020/050385 mailed Oct. 26, 2020 (3 pages).
PCT Written Opinion for PCT Application No. PCT/FI2020/050385 mailed (5 pages).
Finnish Search Report for Finnish Application No. 20195469 mailed Sep. 17, 2019 (2 pages).
Finnish Search Report for Finnish Application No. 20196040 mailed Jun. 16, 2020 (1 page).
Finnish Office Action for Finnish Application No. 20195469 mailed Feb. 3, 2020 (5 pages).
Finnish Office Action for Finnish Application No. 20195469 mailed Nov. 11, 2021 (5 pages).
PCT International Search Report for PCT Application No. PCT/FI2020/050384 mailed Dec. 8, 2020 (7 pages).
Office Action dated Dec. 4, 2024 for the corresponding Chinese Patent Application No. 202080050810.1 (34 pages including English Translation).
Zhou Songsheng, "Quality Manual of Common Construction Techniques", Anhui Science and Technology Press, 1999, 6 pages).
English Translation of Brazilian Office Action dated Mar. 26, 2024 for the corresponding Application No. BR112021024476-0 (4 pages).
Search Report of Oct. 31, 2023 for corresponding Russian patent application No. 2021137573/05 (2 pages).
Communication pursuant to Rule 164(2)(b) and Article 94(3) EPC dated Apr. 17, 2024 for corresponding EP Application No. 20747446.1 (9 pages).
Chinese Office Action dated Jun. 4, 2024 for Chinese Applicaton No. 202080050810.1 including English Translation (9 pages).
Office Action dated Jan. 31, 2024 for the corresponding Chinese Patent Application No. 202080050810.1 (10 pages including English Translation).
Office Action dated Jan. 31, 2024 for the corresponding Chinese Patent Application No. 202080050738.2 (9 pages including English Translation).
Finnish Office Action for Finnish Application No. 20195469 mailed Feb. 16, 2023 (7 pages).
Office Action dated Dec. 5, 2024 for corresponding U.S. Appl. No. 17/616,030 (27 pages).

* cited by examiner

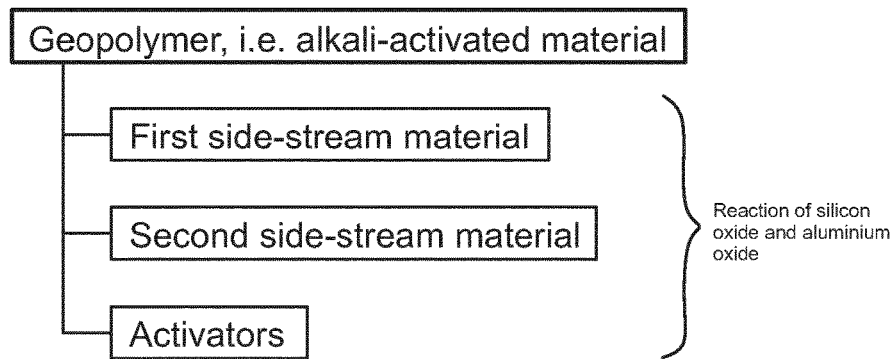

FIG. 1

Process steps to manufacture a geopolymeric earthwork material

Load first side-stream material from waste pile into mixer

Transfer from waste pile to admixture station

Feed second side-stream material into mixer

Feed activators into mixer

Mix paste in mixer

Transfer paste to casting area in mixer

Unload paste and cast onto casting area from mixer

Allow paste to harden in conditions prevailing in casting area

Quarry casting pile to obtain blocks

Crush blocks extracted by quarrying

Use crushed material as crushed or angular stone

FIG. 2

Load into mixer

Admixing

Mixing

Foaming

Transfer

Transfer

Unloading
or casting

Casting pile

ARRANGEMENT AND METHOD FOR MIXING A PASTE AT A WASTE DISPOSAL SITE

This application is a National Stage Application of PCT/FI2020/050385, filed 3 Jun. 2020, which claims benefit of Ser. No. 20/195,469, filed 3 Jun. 2019 in Finland, and which applications are incorporated herein by reference. To the extent appropriate, a claim of priority is made to each of the above disclosed applications.

BACKGROUND OF THE INVENTION

The invention relates to an arrangement and method for mixing and handling side-stream materials.

The object of the invention is described in more detail in the preambles of independent claims of the application.

Large quantities of industrial side-stream materials, such as ashes, slags and precipitates, are formed in industry. Often, it is difficult to utilize these materials due to the components contained in them. In addition, handling of these side-stream materials has been found to be difficult. In consequence, side-stream materials are difficult to utilize and they even have to be tipped in waste piles. Production plants incur significant costs and environment risks because of waste.

BRIEF DESCRIPTION OF THE INVENTION

The idea of the invention is to provide a new and improved arrangement and method for mixing and handling industrial side-stream materials.

Characteristic features of the method according to the invention are presented in the characterizing part of the independent device claim.

Characteristic features of the method according to the invention are presented in the characterizing part of the independent method claim.

The idea of the proposed solution is that at least one industrial side-stream material is mixed by means of a mixer connected to a movable work machine. The solution thereby utilizes a movable mixer.

One advantage of the proposed solution is that a mixer unit formed by a work machine and a mixer is a small investment and functionally very flexible. It is easy to scale the solution by increasing the number of the units. In addition, the solution is very simple and does not require massive equipment. It is not necessary to build any new fixed infrastructure at a factory waste disposal site or a corresponding work site due to the proposed solution.

Further, an advantage of the proposed new method is that difficultly handleable side-stream materials may be processed at a factory waste disposal site to a form in which their transporting by normal transportation means to a site of usage is efficient and safe. In the method, paste may be formed in the mixer into a ready-to-cast paste batch in one operation.

The proposed solution is suited for manufacture and handling on an industrial scale and the end product may be an industrial product. Geopolymers may be manufactured from industrial side-streams by means of the solution in the same pace as the side-streams are being produced.

It is to note that in this application a geopolymer may also mean an alkali-activated material. In light of the current knowledge a geopolymer and an alkali-activated material mean the same material. In this type of material, silicon oxide $SiO_2$ and aluminium oxide $Al_2O_3$ have reacted and formed a compression-resistant solid structure. Sometimes geopolymers are also referred to in literature as a subset of alkali-activated materials. In this type of material, silicon oxide $SiO_2$ and aluminium oxide $Al_2O_3$ are instrumental in the formation of so-called geopolymer cement which is a cement-like binder. Geopolymer cement may be utilized in the manufacture of a compression-resistant, concrete-like material.

Further, it may be stated that a geopolymer is a cementitious binder which may be utilized for the manufacture of a concrete-like material, and which is produced from a silicon and aluminium containing material, for example a side-stream material in alkaline, i.e. high pH, conditions. A concrete-like strong material produced in a reaction of industrial mineral side-streams and alkaline components is also generally called a geopolymer. Alkaline components such as sodium-based solutions are used as reactive agents in the manufacture.

The idea of one embodiment is that the mixer is designed and intended for the mixing of industrial side-stream materials in the manufacture of a geopolymer. The mixer comprises a bucket part for loading and transferring the side-stream material. The bucket part thus forms a space into which admixtures may be loaded and fed. Further, the mixer comprises a mixer apparatus for mixing the side-stream material which has been loaded into the space delimited by the bucket. The mixer may be connected to a suitable work machine by means of a connecting device. Typically the work machine has a boom to which the mixer may be connected such that it may be moved in multiple ways by means of articulations and actuators of the boom. The connecting device enables the mixer to be removed, whereby the work machine may at times be used for other work tasks, for example as proposed in this application for loading a geopolymer quarry material to a crusher as well as for loading crushed material. The mixer may also be removed for the time of maintenance and repair.

The idea of one embodiment is that the above-mentioned mixer is pushable or forceable by means of the work machine into a pile formed by tipped material for loading the material to be handled into the mixer. Thus, no separate loading equipment is needed and the operation is efficient. Further, the configuration is advantageous when the side-stream material is in a particularly difficulty handleable form.

The idea of one embodiment is that the mixer is a bucket-type device in which the volume of the bucket part is at least 1 m³. The volume of the mixer may be 5-7 m³ or even more.

The idea of one embodiment is that the bucket part of the mixer is an open-top structure, whereby the mixer is arranged to receive material from an upper feed or admixture station. Thus the mixer may simply be introduced under a hopper, a dispenser or a feeder. Admixing may thereby be quick and efficient when it is done directly into the mixer without intermediate steps and additional equipment.

The idea of one embodiment is that the mixer is tiltable from a mixing position to an unloading position, in which unloading position the paste located in the mixer is arranged to flow out of the bucket part by the effect of gravity. The side-stream materials may, with each other as well as possible admixtures and water, form a dough-like or viscous paste, the unloading of which without tipping is difficult.

The idea of one embodiment is that the mixer has a horizontal mixing position and it is tiltable downwards relative to the mixing position. The unloading position may be some predetermined downwardly sloping angular position. The mixer may be tilted such that its bottom part is arranged in a vertical direction, and further, the mixer may in some cases be even tilted over the vertical tilting position, i.e. close to upside down. Thereby the unloading of difficulty handleable dough-like pastes may be facilitated. It is also possible to swing or oscillate the mixer during mixing in order to facilitate the mixing.

The idea of one embodiment is that between the mixer and a free end of the boom of the work machine there is a tilting device for tilting the mixer to the unloading position.

The idea of one embodiment is that the mixer is tiltable to the unloading position by means of articulation of the boom of the work machine.

The idea of one embodiment is that the mixer comprises a tilting device by which the bucket part is tiltable in relation to a pivot joint from the mixing position to the unloading position.

The idea of one embodiment is that the mixer apparatus of the mixer is operable during unloading. This may significantly facilitate the paste formed by difficultly handleable side-stream materials. For example, a paste comprising mainly green liquor precipitate may be a viscous or dough-like material, the unloading of which just by dumping or tipping may be difficult or even impossible.

The idea of one embodiment is that the mixer comprises at least one vibrator device for facilitating the unloading of the bucket part.

The idea of one embodiment is that the mixer comprises at least one vibrator device which is operable not only during unloading but also during mixing in order to facilitate the mixing.

The idea of one embodiment is that said vibrator device comprises a rotary eccentric body. Alternatively the vibrator device may comprise an impact device.

The idea of one embodiment is that the mixer comprises at least one measuring device for determining properties of the material in the mixer. Measurement data from a measuring unit may be transmitted by means of a wireless data communication connection to the admixture station, whereby the system may in advance calculate the amount of necessary admixtures relative to the obtained measurement data. The system may also in advance prepare admixture batches in such a way that the operation at the admixture station is as smooth and as efficient as possible.

The idea of one embodiment is that the mixer comprises at least one weighing device for determining a mass of the material loaded into the bucket part. Alternatively the weighing device may be provided in connection with the work machine, for example onto the boom or axles. Thereby real-time data are obtained on the weight of the handled material and paste.

The idea of one embodiment is that the mixer comprises at least one measuring device for determining moisture of the material in the mixer. On the basis of moisture data, additional moistening at the admixture station may be adjusted as necessary, and further the moisture data may be used for adjusting the amount of other admixtures.

The idea of one embodiment is that the mixer comprises at least one measuring device for determining the force required for mixing. Properties of the paste being mixed, such as structure, plasticity, moisture and homogeneity, may be determined from the force resisting the mixing.

The idea of one embodiment is that the mixer comprises at least one camera for visually inspecting the composition of the paste. Visual data from the camera may be transmitted to an operator of the work machine or an operator working at a monitoring station or an expert.

The idea of one embodiment is that the mixer comprises at least one horizontal mixer shaft which is rotatable by means of a rotation motor about its longitudinal axis. The mixer shaft is provided with a plurality of mixer blades having mixing surfaces in an angular position relative to the longitudinal direction of the mixer shaft.

The idea of one embodiment is that the rotation motor for rotating the mixer shaft is a hydraulic motor. In the booms of work machines, hydraulic energy is typically well available. Further, the rotation motor and power transmission may be arranged outside the bucket part, separately from the materials being mixed.

The idea of one embodiment is that the mixer comprises two horizontal mixer shafts which are rotatable by means of at least one rotation motor about their longitudinal axes. The rotating directions of the mixer shafts are opposite to each other and each one of the mixer shafts is provided with a plurality of mixer blades having mixing surfaces in an angular position relative to the longitudinal direction of the mixer shaft. The mixer blades of the adjacent mixer shafts are provided at axially different locations relative to each other, such that the mixer blades of the adjacent mixer shafts are partly overlapped. This type of double-shaft mixer has been found to be particularly efficient in the mixing of side-stream materials.

The idea of one embodiment is that the upper surface of the bottom of the bucket part of the mixer is shaped to correspond to the above-mentioned one or two mixer shafts with mixer elements. Thus the bottom may comprise one or two arched bottom parts at the mixer shafts. The shape of the bottom may also affect the efficiency of mixing to some degree.

The idea of one embodiment is that the mixer unit comprises a movable work machine and a mixer connected to a boom thereof. The work machine may be a wheel loader. As the mixer is connected to the work machine, it is functionally a very flexible movable unit. If necessary, two or more units may operate at a factory waste disposal site or a corresponding work site, so the system is easily scalable.

The idea of one embodiment is that the mixer is connected to an excavator, a forklift, a telescopic handler, a tractor or another independently movable and controllable work machine or vehicle comprising a movable chassis.

The idea of one embodiment is that the mixer unit is an independently controllable mobile device. In some cases, control of the mixer unit may be provided by means of manned remote control. Further, the operation of mixer units operating in a work area may be automatized, whereby they may even operate in an unmanned mode.

The idea of one embodiment is that the mixing of fed materials and substances is carried out mainly during transfer of the mixer. In other words, the mixing is carried out during transfer from the admixture station to an unloading site, and thus there is no need for stationary mixing.

The idea of one embodiment is that the solution relates to an arrangement at a factory waste disposal site. The arrangement comprises at least one waste pile of a first industrial side-stream material. This first side-stream material may be the main component of the mixture being formed. The arrangement further comprises at least one movable work machine which is provided with a mixer. The work machine is arranged to take said first industrial side-stream material directly with the mixer from said waste pile for handling it by the mixer. Thus, no separate device is needed for loading. The arrangement also comprises an admixture station having at least a first feed device for feeding a second industrial side-stream material into the material in the mixer of the work machine. The mixing device mixes said side-stream materials, whereby a geopolymeric hardenable paste is formed, which is unloaded after mixing onto a casting area where said side-stream materials continue reacting, and the material produced begins to harden. Hardening is allowed to continue at least to a partial hardness at which the material has a strength which is suitable for crushing. The unloading may be described by way of casting of the dough-like paste, such that a desired formation may be formed from the paste. In the proposed arrangement the material being handled is kept in the mixer of the work machine for the time of the whole handling process from the waste pile up to the casting area. The proposed arrangement is logistically efficient and requires only minor investments.

The idea of one embodiment is that the arrangement is free of transfer devices other than said work machine between the waste pile and the casting area.

The idea of one embodiment is that the work machine provided with the mixer is a multi-functional device which is arranged to operate as a loading, transferring, mixing and casting device between the waste pile and the casting area.

The idea of one embodiment is that the mixing unit, admixture station and crushing device as described in this document may all be movable devices which may be easily transferred even to different worksites and factory waste disposal sites. It is for example possible that a chain of machines formed by said devices may circulate different worksites under operation by a contractor, whereby the utilization rate of the apparatus is very high.

The idea of one embodiment is that a large quantity of paste batches formed by the mixer are unloaded into a uniform hardenable structure. In other words, by way of unloading, an artificial rock or large hardenable mounds, heaps or clamps will be cast as batch casting. The casting may be carried out in a mould-free manner over a ground-supported plane surface.

The idea of one embodiment is that the proposed arrangement further comprises a quarrying device for quarrying the hardened paste in the casting area. The material extracted by quarrying, i.e. quarry material, is fed to a crusher device for crushing it into a crushed material. The crushed material may be transferred from the crusher by means of a conveyor into heaps in a temporary storage area. Transfer and handling of the crushed material is easy compared to the handling of raw materials and the paste formed from the raw materials. Handling of the crushed material does not differ from the handling of virgin crushed or angular stone.

The idea of one embodiment is that the geopolymer paste cast onto the casting site is allowed to harden into an artificial rock, and blocks fitting into a feed opening or mouth of the crusher device are extracted from the artificial rock by the quarrying device.

The idea of one embodiment is that after being unloaded, the paste is allowed to harden to a compression strength of at least 1 Mpa before crushing. Thereby the quality of the crushed material will be good, and crushing itself will be carried out smoothly.

The idea of one embodiment is that the factory waste disposal site is in connection with a pulp mill. The pulp mill produces green liquor precipitate as a side-stream material which is tipped in a waste pile at the factory waste disposal site. The first industrial side-stream material taken from the waste pile with the mixer is thus green liquor precipitate, which is also called dregs. Green liquor precipitate is a difficultly handleable material and the solution proposed in this document introduces a simple solution for handling it.

The idea of one embodiment is that the first industrial side-stream material taken from the waste pile with the mixer is green liquor precipitate. Green liquor precipitate, i.e. dregs, is difficulty handleable waste. By means of the proposed solution, the dregs are uninterruptedly transported by means of a single transfer means to an unloading point or up to the casting area without intermediate unloading or loading stages.

The idea of one embodiment is that the first industrial side-stream material is the above-mentioned green liquor precipitate. In this case the second industrial side-stream material fed by a first feed device of the admixture station is blast furnace slag or metakaolin. In tests performed, these side-stream materials were found to suit particularly well together in the manufacture of a compression-resistant geopolymer. The price of green liquor precipitate is negative, i.e. because of its safe use, the waste management fees as defined by waste legislation may be avoided. Further, the price of said blast furnace slag and metakaolin is low as compared to many other side-stream materials. Said materials and their mixtures contain silicon oxide and aluminium oxide which are needed in the reaction and hardening of the geopolymer. It may also be possible to use a material equivalent to said blast furnace slag and metakaolin in having a similar combination of elements as admixture with the dregs.

The idea of one embodiment is that the admixture station further comprises a third feed device for feeding lye, i.e. sodium hydroxide (NaOH), into the mixer, and further a fourth feed device for feeding waterglass, i.e. sodium silicate $Na_4SiO_4$, into the mixer.

The idea of one embodiment is that the hardenable paste mixed in the mixer comprises, as the main component, green liquor precipitate and blast furnace slag, metakaolin or the like. In addition, either lye, waterglass or both of them are mixed into the paste as activators. A hardened material formed from these substances has been found to have a particularly good compression strength as well as insolubility in tests.

The idea of one embodiment is that the admixture station comprises a fifth feed device for feeding water into the mixer in order to adjust the moisture content of the paste being mixed.

The idea of one embodiment is that the solution relates to a method for mixing a paste. In the method, at least two industrial side-stream materials are mixed together in the manufacture of a geopolymer. The mixing is carried out in a mixer arranged onto a movable work machine.

The idea of one embodiment is that the solution relates to a method in which the mixer is forced by the work machine into a waste pile for loading a first side-stream material into the mixer. After loading, the loaded portion of the first side-stream material is transferred in the mixer from the waste pile to an admixture station. At the admixture station, at least one second side-stream material is added into the first side-stream material located in the mixer. Then the materials located in the mixer are mixed by means of rotary mixer elements of the mixer. Finally, the mixed paste is transferred in the mixer of the work machine to a casting area and unloaded.

The idea of one embodiment is that the mixer is unloaded by tilting its feed opening in a downward direction and by simultaneously operating the mixer elements.

The idea of one embodiment is that a mass of the first side-stream material taken by the mixer from the waste pile is weighed. In addition, the amount of materials fed at the admixture station is adjusted in response to the determined mass.

The idea of one embodiment is that moisture of the first side-stream material taken into the mixer is determined, and water is added to the mixer at the admixture station in response to the determined moisture falling below a determined minimum limit.

The idea of one embodiment is that the solution relates to a method in which several batches of a hardenable geopolymer paste are unloaded onto a casting area from the mixer in order to provide a uniform casting formation. The paste is allowed to dry for at least two days so that the material obtains a compression strength which is suitable for crushing. Then, smaller blocks are quarried from the hardened or partly hardened casting formation and the blocks are crushed in a crusher device to obtain a fraction which is smaller than a predetermined grain size.

The idea of one embodiment is that the material is allowed to reach its final hardness in the crushed form. Full hardness of the material is generally reached within about 90 days, but crushing capacity and necessary strength for crushing are often reached already within a few days from casting. The final hardness is thereby reached at the site of usage. When quarrying and crushing are carried out for material having only reached its partial hardness, the work is quicker to carry out and does not require so heavy equipment as would be needed for breaking a fully hardened material. In addition, the solution is ecological, because quarrying and crushing require less energy when the material has not yet reached the full strength.

The idea of one embodiment is that the paste is foamed after mixing the admixtures. By means of foaming a lightweight yet strong material is producible. This type of foamed crushed material with a porous structure may have a good thermal insulation capacity, whereby it may also be used as frost insulation.

The idea of one embodiment is that the foaming may be carried out chemically for example by adding hydrogen peroxide to the paste, or alternatively mechanically by using a foaming apparatus which may substantially correspond to an apparatus designed for foaming concrete.

The idea of one embodiment is that only one side-stream material is mixed by the mixer with the other components to form a geopolymer.

The idea of one embodiment is that three side-stream materials are mixed by the mixer with the other components to form a geopolymer.

The above-described embodiments and their features may be combined with each other to provide desired configurations.

SHORT DESCRIPTION OF THE FIGURES

Figure 4:
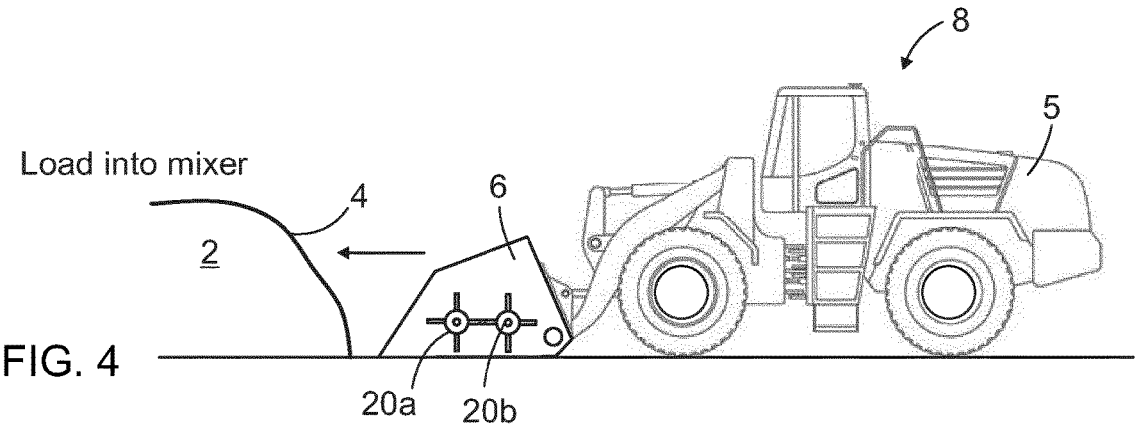
Figure 5:
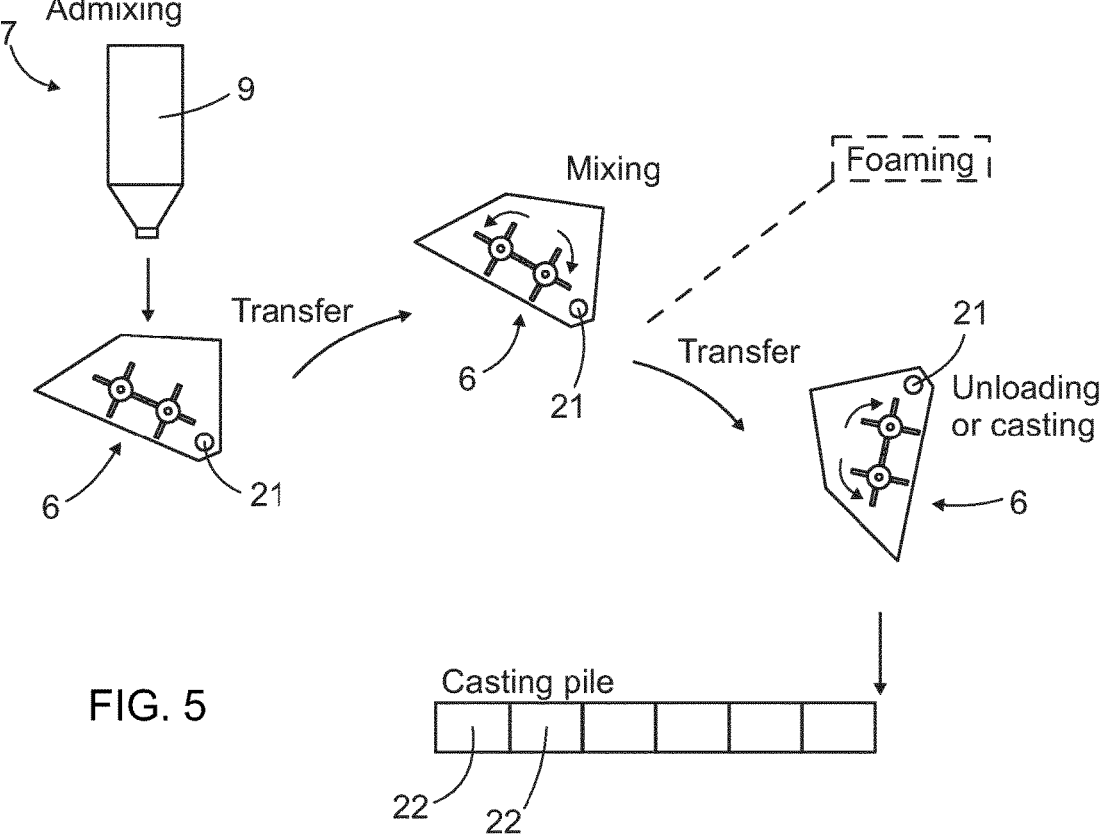
Figure 6:
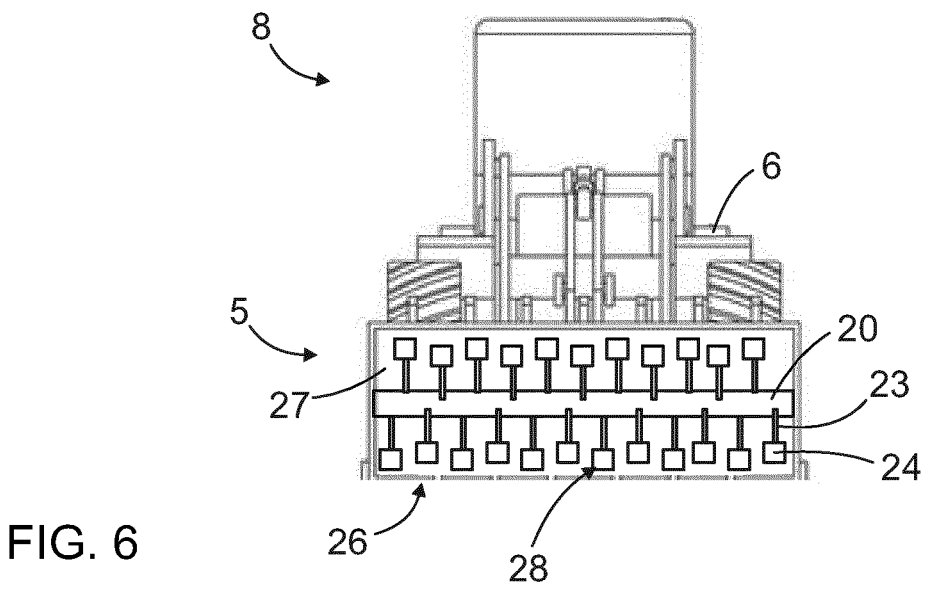
Figure 7:
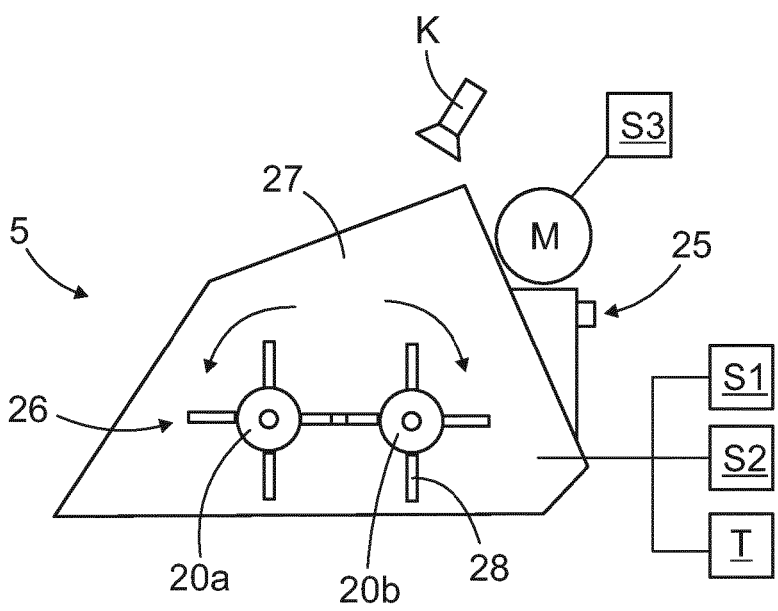
Figure 8:
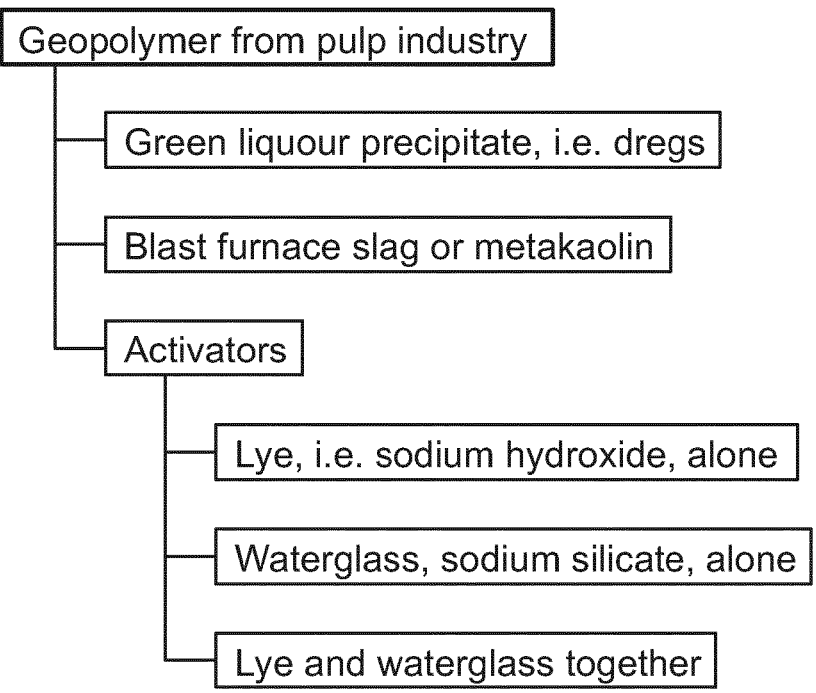

Some embodiments of the proposed solution are illustrated in more detail in the following figures, in which FIG. 1 is a schematic and simplified diagram presenting admixtures of one geopolymer, FIG. 2 is a schematic and simplified diagram presenting the manufacture of one geopolymeric earthwork material, FIG. 3 schematically illustrates the manufacture of one geopolymer at a factory waste disposal site, FIG. 4 schematically illustrates one mixing unit formed by a mixer and a work machine, FIG. 5 schematically illustrates the use of one mixer in different stages of a geopolymer manufacturing process, FIG. 6 illustrates one mixer and its rotary mixer shaft as seen from the front, FIG. 7 schematically illustrates one mixer and its apparatuses as seen from the side; and FIG. 8 is a schematic diagram presenting components of a mixed paste.

For clarity purposes, some embodiments of the proposed solutions are illustrated in the figures in a simplified form. In the figures, same reference numerals are used to denote the same elements and features.

DETAILED DESCRIPTION OF SOME EMBODIMENTS

FIG. 1 represents a geopolymer comprising at least two side-stream materials. In some cases even more side-stream materials may be used in the formation of a hardenable paste. A common feature of these side-stream materials and their mixture is that they comprise silicon oxide $SiO_2$ and aluminium oxide $Al_2O_3$ which react with each other and form a paste which hardens to a compression-resistant state. The compression strength achieved is at least 10 Mpa, but is generally over 40 Mpa, and sometimes even over 80 Mpa.

Industrial side-stream materials are e.g. tailings, such as red mud. Further side-stream materials are slags from the steel industry, such as blast furnace slag, steel slag and refined steel slag. Ashes from the energy industry, such as organic ashes produced in the combustion of wood as well as inorganic ashes produced in the combustion of coal, oil shale and the like are also side-stream materials. The ashes may include fly ash, grate ash or bottom ash formed in boilers. Further side-stream materials are produced in the forest industry. In the pulp industry, green liquor precipitate is formed as waste in large quantities.

Green liquor precipitate is a side-stream material formed in the wood processing industry in the manufacture of pulp, and is also called dregs. Dregs are produced in a sulphate process at a chemical recovery line. The dregs are removed from green liquor in a green liquor clarifier before conducting green liquor to causticizing, i.e. to the manufacture of cooking chemicals. Green liquor precipitate is a mixture of various green liquor insoluble substances, inorganic salts, such as oxides, carbonates and sulphides. It also contains hazardous metals in addition to the normal alkali metals and calcium and magnesium. Dregs removed from the process are washed in order to recover the sodium compounds contained in them. The washed dregs are dried before tipping in a waste disposal site, and their typical dry matter content is about 50%.

Further, one or more activators may be added to the mixture formed by the side-stream materials, or in some cases the activator is not needed but the side-stream materials react with each other. Or, they may react after water has been added to the mixture.

The method and solution proposed in this document may be used in a versatile way for the manufacture of products comprising various industrial side-stream materials.

Further, it is stated that in some cases only one side-stream material may be used in the manufacture of a geopolymer. In that case, other admixtures are mixed with the side-stream material in a mixer.

FIG. 2 is a diagram presenting an earthwork material manufacturing process as described in this application. The steps and features presented in the diagram have been described in detail already hereinabove, and are also disclosed in the description of FIG. 3.

In FIG. 3 an industrial plant or a factory 1 produces a first side-stream material 2 which is tipped in a waste pile 4 at a factory waste disposal site 3. The waste pile 4 may be a mound-like formation, a heap or a clamp. It may also be a previously deposited formation.

A work machine 5 has a mixer 6 by which the side-stream material 2 is taken from the waste pile 4. A mass of the loaded material and possibly other properties may be measured and the measurement results are sent to a control unit CU of an admixture station 7. The combination of the work machine 5 and the mixer 6, i.e. a mixing unit 8, transfers to the admixture station 7 where a second side-stream material may be fed into the mixer 6 from a second feed device 9. Activators may be fed from a third feed device 10 and a fourth feed device 11. Further, water may be fed from a fifth feed device 12 if necessary. The feed devices 9-12 may comprise upper containers or hoppers below which the mixer 6 may be positioned for admixing. In some cases the second side-stream material is not fed into the paste.

The materials fed into the mixer 6 are mixed during their transfer, and finally the formed paste is unloaded onto a casting area 13. A uniform larger formation may be formed from the paste, for example a type of artificial rock 14. The material is allowed to harden at least to a partial hardness. Blocks 16 may be quarried from the artificial rock 14 for example with a hydraulic impact hammer 15 as small-batch quarrying, with wedges or some other quarrying method. When quarrying is carried out before reaching the final hardness, it may be performed even with a bucket of an excavator or a rock tine mounted to it. The extracted blocks 16 may be fed into a feed opening of a crusher device 17 and crushed into crushed material 18 of a desired grain size. The crushed material 18 may be stored temporarily 19 and transferred to a site of usage by road transport.

The crusher device 17 may be for example a jaw crusher, an impact crusher or a cone crusher.

If necessary, the quarrying and crushing may also be performed after a longer time, whereby the quarrying and crushing equipment is selected according to the situation.

FIG. 4 illustrates a situation where the work machine 5 pushes the mixer 6 into the waste pile 4 and thereby loads the first side-stream material 2. In FIG. 4 it is shown that the mixer 6 may comprise two horizontal mixer shafts 20a, 20b which are provided with mixer elements and which may be rotated.

In FIG. 5 it is shown that the mixer 5 may be tilted to a desired position about a pivot joint 21 and introduced at the admixture station 7 under the feed device 9 for feeding the admixtures. The top of the mixer 5 is open, for receiving the admixtures. Further, the mixer 5 may be kept in a desired tilt position during the mixing. The mixing may be carried out by the rotary mixer shafts 20a, 20b during the transfer. When the paste has been mixed, it may be foamed before unloading, if desired. Foaming devices may be arranged in connection with the mixer 5. At the unloading site the mixer 5 may be tilted in a downward direction about the pivot joint 21, and the unloading may further be facilitated by means of the mixer devices.

The unloading may be carried out by way of batch casting into a casting pile. In this process a large quantity of smaller batches 22 form a larger formation.

In FIG. 6 it is illustrated that the rotary mixer shaft 20 of the mixer 5 may comprise a large number or arms 23 which are provided with mixing surfaces 24. In a mixer device 26 there may be one, two or even more of such parallel mixer shafts 20 provided with mixer blades 28. Alternatively the mixer shafts may comprise screw-type mixing surfaces.

In FIG. 7 it is illustrated that the mixer shafts 20a, 20b of the mixer device 26 of the mixer 5 may rotate in opposite directions. A rotation motor M for rotating the shafts 20 is located outside the bucket part 27. Further, the mixer 5 comprises a connecting device 25 for connecting it to the work machine. The mixer 5 may also be provided with a sensor S1 for determining a mass of the material located in the mixer, as well as with a sensor S2 for determining moisture or other property of the material. A vibrator T may also be arranged with the mixer to provide vibration facilitating the unloading and mixing.

FIG. 7 additionally illustrates a sensor S3 or a corresponding measuring device by which a resistance to rotation caused by the paste being mixed may be determined by monitoring the motor M. The resistance to rotation may manifest as an increased need for rotation torque, rotating force, drive energy or the like, or alternatively for example from a change in the rotation speed. The resistance to rotation may provide information on the plasticity and also moisture of the paste. Further, there may be one or more cameras K in connection with the mixer to produce visual data which may be transmitted to an operator for making sensory observations on the paste being mixed. A skilled operator may see the plasticity of the paste from a video camera picture.

FIG. 8 presents possible components of a geopolymer comprising a side-stream material from the pulp industry.

The figures and their description are only intended to illustrate the inventive idea. However, the scope of protection of the invention is defined in the claims of the application.

The invention claimed is:

1. An arrangement at a factory waste disposal site, which arrangement comprises at least one waste pile of a first industrial side-stream material, wherein the arrangement further comprises:

at least one movable work machine which is provided with a mixer, and wherein the work machine is arranged to take said first industrial side-stream material directly with the mixer from said waste pile for handling said first industrial side-stream material by the mixer;

an admixture station which comprises at least one feed device for feeding at least one admixture into said first industrial side-stream material located in the mixer of the work machine;

a casting area which is arranged to receive from the mixer a geopolymeric hardenable paste formed by said first industrial side-stream material and said at least one admixture as a result of mixing said first industrial side-stream material and said at least one admixture;

a quarrying device for quarrying hardened paste in the casting area;

a crusher device for crushing material extracted by quarrying to obtain crushed material; and a temporary storage for receiving crushed material from the crusher device;

and wherein said first industrial side-stream material is kept in said mixer of the work machine from the waste pile up to the casting area.

2. The arrangement according to claim 1, wherein the factory waste disposal site is located in connection with a pulp mill; and the waste pile is green liquor precipitate, whereby the first industrial side-stream material taken from the waste pile with the mixer is green liquor precipitate.

\* \* \* \* \*